United States Patent [19]
Yoshinaka

[11] Patent Number: 5,093,732
[45] Date of Patent: Mar. 3, 1992

[54] APPARATUS FOR CORRECTING TIME BASE FLUCTUATIONS IN DIGITAL SIGNALS

[75] Inventor: Tadaaki Yoshinaka, Kanagawa, Japan

[73] Assignee: Sony Corporation, Tokyo, Japan

[21] Appl. No.: 466,658

[22] Filed: Jan. 17, 1990

[51] Int. Cl.$^5$ ............................................. H04N 5/95
[52] U.S. Cl. .................................... 358/339; 360/36.2
[58] Field of Search ................................ 358/320–326, 358/337–339; 360/8, 9.1, 10.1, 33.1, 36.1, 36.2

[56] References Cited

U.S. PATENT DOCUMENTS 4,141,039  2/1979  Yamamoto ............................ 358/339
4,769,720  9/1988  Heitmann .............................. 358/312

Primary Examiner—Robert L. Richardson
Attorney, Agent, or Firm—Lewis H. Eslinger; Jay H. Maioli

[57] ABSTRACT

Time base error correction apparatus for correcting time base fluctuations in input digital signals containing block sync signals includes a clock generator for generating clock signals from the input digital signals that contain the same time base fluctuations. A first FIFO memory for writing and reading out the input digital signals on the basis of the generated clock signals and on the basis of reference clock signals, respectively, corrects the clock phase, and a second FIFO memory controlled during writing on the basis of the block sync signal separated from the output of the first FIFO memory and controlled during readout on the basis of a reference block sync signal corrects phase errors of the block sync signal.

5 Claims, 3 Drawing Sheets

APPARATUS FOR CORRECTING TIME BASE FLUCTUATIONS IN DIGITAL SIGNALS

BACKGROUND OF THE INVENTION

1. Field of the Invention

This invention relates generally to apparatus for correcting time base fluctuations in digital signals and, more particularly, to a time base error corrector using uncomplicated memory units.

2. Description of the Background

The reproduced analog video signals from a conventional video tape recorder (VTR) usually contain time base fluctuations that must be removed by time base compensation using the so-called time base error correcting apparatus (TBC). An example of one such system is shown in U.S. Pat. No. 4,054,903.

Such time base correction using a TBC is similarly employed in digital VTR's operating on digital video signals. The above-described conventional time base correction apparatus requires complicated circuitry in order to perform readout/writing control of the main memory that is employed In addition, the typical TBC apparatus is expensive due to the requirement for high-speed operation of the main memory. The circuitry is also cumbersome because it is necessary to provide a write address generator, a readout address generator, serial/parallel converters, and/or a parallel/serial converter.

In digital VTRs the usual practice is to perform the recording operation using multiple channels, because of the increased data volume and, typically, the data is recorded in eight channels. Consequently, the number of circuit elements in the above-described TBC is multiplied by the number of channels, resulting in quite a large-scale apparatus.

Another time base correcting apparatus in Japanese Patent Publication 63-72287 has been proposed, and this apparatus is designed so that time base fluctuations contained in the time base compressed signals are corrected by first-in first-out (FIFO) memories. In that system, although correction of the clock phase can be achieved, there is no provision made for correcting errors in the block phase of the digital signal.

OBJECTS AND SUMMARY OF THE INVENTION

Accordingly, it is an object of the present invention to provide a time base correction apparatus that can eliminate the defects inherent in such systems proposed heretofore.

It is another object of the present invention to provide a time base correction apparatus in which time base correction may be achieved by an uncomplicated circuit construction, so that the cost as well as the scale of the apparatus can be reduced.

According to an aspect of the present invention a time base correction apparatus is provided for correcting time base fluctuations in input digital signals containing block sync signals, which apparatus includes a clock generator for generating clock signals on the basis for the input digital signals, a first FIFO memory device for writing and reading out the input digital signals on the basis of the generated clock signals and reference clock signals, respectively, for correcting the clock phase and also a second FIFO memory device controlled in the writing mode on the basis of the block sync signal and controlled in the read-out mode on the basis of the reference block sync signal for correcting the phase of the block sync signal.

According to the present invention, as described hereinabove, the clock phase of the input digital signal is synchronized with the reference clock signals by a first FIFO memory device, while the phase of the block sync signal of the input digital signal is synchronized with the reference block sync signals by a second FIFO memory device.

The above and other objects, features, and advantages of the present invention will become more apparent from the following description when read in conjunction with the drawings.

DETAILED DESCRIPTION OF PREFERRED EMBODIMENT

Figure 1:
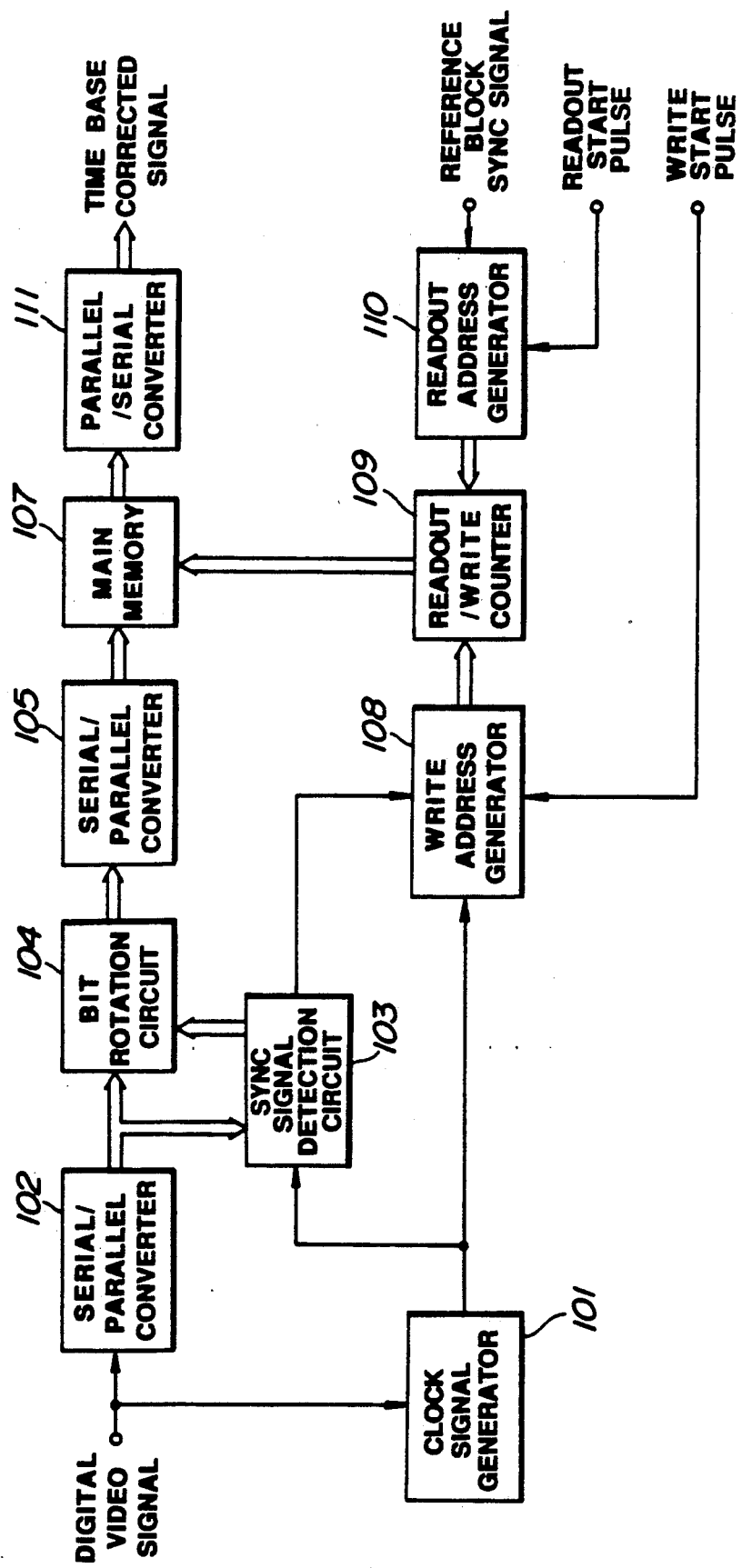
FIG. 1 is a block diagram of a conventional time base correction apparatus.

Before describing a preferred embodiment of the present invention a conventional time base correction system as employed in a typical digital VTR, will be described with reference to FIG. 1. Referring to FIG. 1, input digital video signals reproduced by the digital VTR in the form of single-bit (1-bit) serial data containing time base fluctuating components are fed to a clock generator 101 and to a serial/parallel converter 102. Clock generator 101 comprises a phase-locked loop (PLL) circuit and generates clock signals that are in synchronism with the input digital video signals, therefore, they also include whatever time base fluctuating components are present in the input signal. The clock signals are transmitted to a sync signal detection circuit 103 and to a write address generator 108. In the serial/parallel converter 102, the single-bit, or 1-bit, serial digital video signals supplied thereto are converted into parallel data signals, which are then transmitted both to a bit rotation circuit 104 and to sync signal detection circuit 103. Typically, the serial-to-parallel conversion is chosen to produce 8-bit words. Sync signal detection circuit 103 detects block sync signals for each block unit of data, which is defined by a predetermined length of data of the input digital video signals, on the basis of the clock signals from clock signal generator 101. The parallel data from serial/parallel convertor 102 is compared with a reference sync pattern and, hence, the block sync signal is extracted by sync signal detection circuit 103. At the same time the extent to which the parallel signal is out of order is detected and this is all transmitted to bit rotation circuit 104, wherein the unit blocks of the parallel data signals are put into order on the basis of the aforementioned block sync signals. Thus, bit rotation circuit 104 restores the 8-bit parallel data formed by serial/parallel converter 102 from the state in which the upper and lower order bits (most significant and least significant bits) are not in order into the state they were in when recorded. That is, the bits are rotated into the state in which the upper and the lower order bits are in correct order by detecting the deviation in the bit series of the block sync signals detected by the sync signal detection circuit 103. These bits get out of order because the serial/parallel convertor does not know which bit is a first bit, that is, an upper bit or MSB, of the sync block or data block, or which bit is a lower bit or LSB of the sync block or data block. The deviation refers to the difference or amount by which the data are out of order. For example, if an 8-bit serial word is incorrectly evenly divided into two 8-bit parallel words, the deviation would be equal to four.

The data rate of the 8-bit parallel data, which has now been put into order for each of the unit blocks, is lowered by a serial/parallel converter 105 before being transmitted for storage in a main memory 107. A write address generator 108 for generating write addresses for main memory 107 is supplied with write start pulses and with the block sync signals from the sync signal detection circuit 103. Thus, on the basis of the block sync signals, the clock signals, and the write start pulses, write address generator 103 generates write address data used when storing the parallel data signals in main memory 107. This parallel data has a lowered data rate by reason of the operation serial/parallel convertor 105. The generated write address data are first fed to a readout/write counter 109, which is also supplied with readout address data from a read-out address generator 110. The read-out address data is generated by readout address generator 110 on the basis of externally applied read-out start pulses and reference block sync signals. Readout/write counter 109 counts the readout address data and the write address data and alternately transmits the results to the main memory 107 to effect data readout and writing, respectively. The data this is readout from main memory 107 is processed by a parallel/serial converter 111 and output as the required time base corrected digital video signals.

The above-described, previously proposed time base correction system of FIG. 1 suffers from the drawback that readout/write control of main memory 107 is complicated, further, that such main memory 107 is expensive, because it must be operated at high speeds to accommodate the successive read/write operations. The circuit structure is even further complicated by the requirement for write address generator 108, readout address generator 109, serial/parallel converters 102, 105, and the parallel/serial converter 111. Furthermore, multichannel recording, such as 8-channel recording, is usually practiced in digital VTRs dealing with large amounts of data. Thus, a number of the above-described circuits corresponding to the number of channels is necessitated, resulting in even larger scale apparatus.

In view of the foregoing, the present invention provides an arrangement in which time base correction may be achieved by a less complex circuit, in order to reduce the cost and the scale of the overall apparatus.

Figure 2:
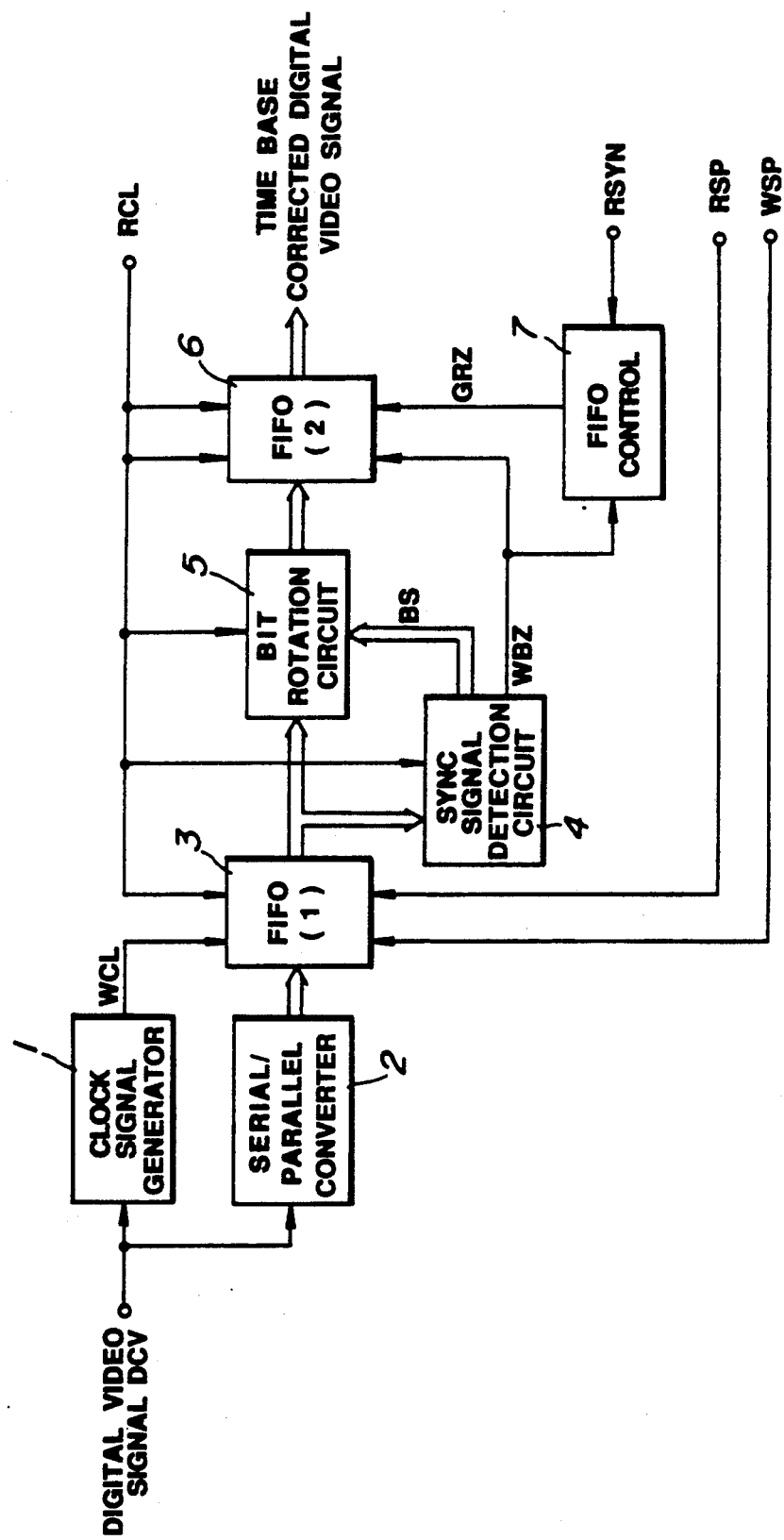
FIG. 2 is a block diagram of a time base correction apparatus according to an embodiment of the present invention.
Figure 3:
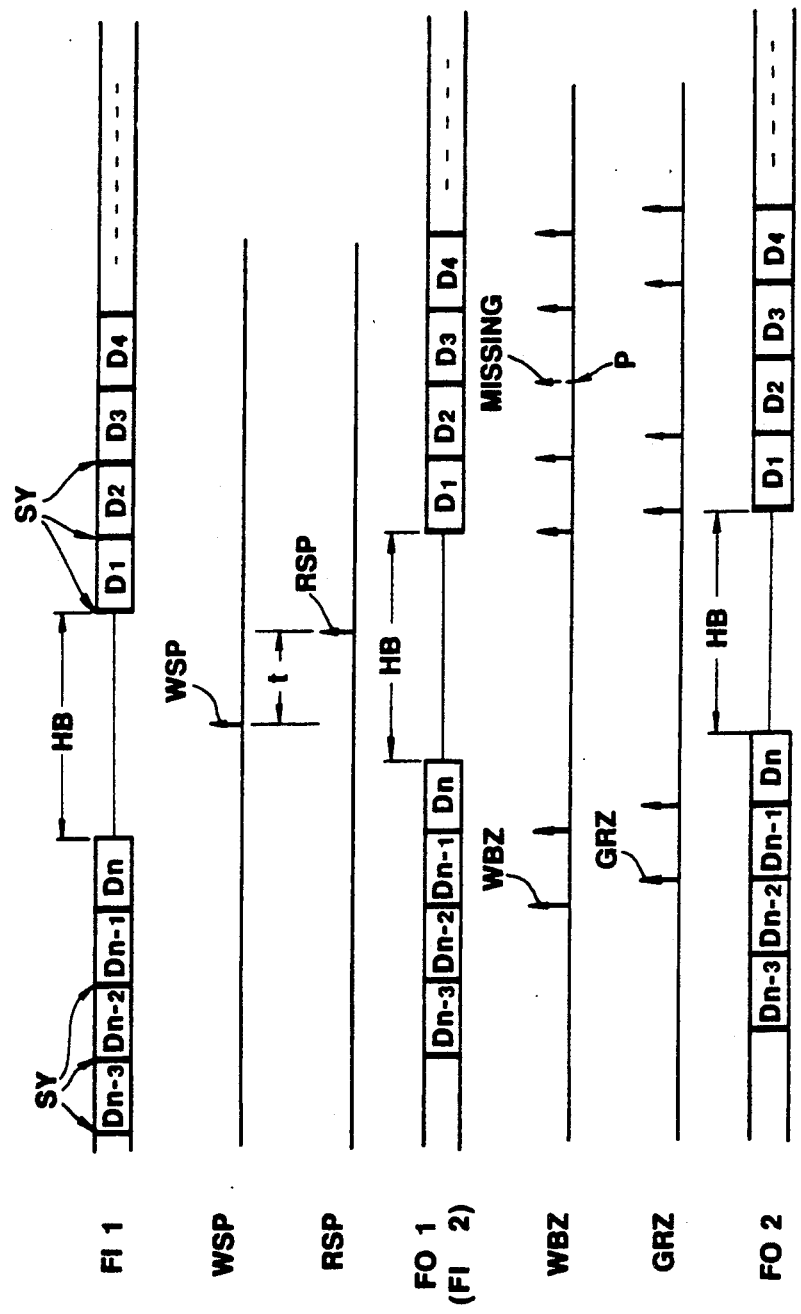
FIG. 3 is a timing chart showing the relationship of signals appearing at various locations in the circuit of FIG. 2.

FIG. 2 represents the basic structure of a time base correction according to an embodiment of the present invention, and FIG. 3 represents the timing of signals appearing at various locations in the time base correction apparatus shown in FIG. 2.

The input digital video signals DVC, which are digital signals reproduced from a magnetic tape using a digital VTR, generally include time base fluctuating components, and these signals are in the format of 1-bit, or single-bit serial data signals. The input digital video signals (DVC) are arranged in units of blocks, $D_1$ to $D_n$, each block having a predetermined, uniform length. Block sync signal data, identification data, and write and readout address data are annexed to each of the unit blocks, $D_1$ to $D_n$, in addition to the actual video signal data.

The input digital video signals (DVC) are supplied to a clock generator 1 that generates clock signals on the basis of the input digital video signals. The input video signals are also fed directly to a serial/parallel converter 2. Clock generator 1 is comprised of a phase-locked loop (PLL) circuit and generates clock signals timed to the input digital video signal DVC and because these clock signals are timed to the input digital video signal DVC, they also include time base fluctuating components. The clock signals are transmitted as write clock signals WCL to a first memory 3, which is a first-in first-out (FIFO) type memory. Serial/parallel converter 2 converts the input digital video signals (DVC) fed thereto into parallel data signals of 8-bits, for example, which are then transmitted to first FIFO memory 3, as an input signal FII shown in FIG. 3.

First FIFO memory 3 is also supplied with reference readout clock signals RCL, while being simultaneously supplied with reference write start pulses WSP and reference readout start pulses RSP. The write start pulse WSP is generated during a head blanking period HB, that is, during the time the VTR head is not scanning the magnetic tape. The reference readout start pulse RSP is subsequently generated a predetermined time delay t, which corresponds to about one half the capacity of the first or second FIFO memory, after the reference write start pulse WSP. This time delay t is shown in FIG. 3. The reference readout start pulse RSP and the reference write start pulse WSP operate respectively as a readout reset input signal and a write reset input signal for first FIFO memory 3. Because the reference readout start pulse RSP and the reference write start pulse WSP are generated during the head blanking period HB while the head is out of contact with the tape, the parallel data comprising the input digital video signal (DVC) are not lost but can be stored in their entirety.

Thus, during the writing of the parallel data signals first FIFO memory 3 is reset by the reference write start pulse WSP, so that the writing is performed in timed relation with the write clock signal WCL. The readout operation of first FIFO memory 3 is reset by the reference readout start pulse RSP, and output signals are issued in timed relation with the reference readout clock signal RCL, so that the output comprises time base corrected data. Meanwhile, a data write address pointer in the first FIFO memory 3 is simultaneously incremented.

The parallel data output signal FO1 of FIG. 3 is readout from first FIFO memory 3 in timed relation with the reference readout clock signal RCL and transmitted to a sync signal detection circuit 4 and to a bit rotation circuit 5. Sync signal detection circuit 4 and bit rotation circuit 5 also receive the above-mentioned reference readout clock signal RCL. The parallel data signals thus stored in first FIFO memory 3 are corrected as to the time base fluctuations, however, because they are processed by serial/parallel converter 2 in a state different from the state in which they were recorded as 8-bit parallel data signals, the upper and lower order bits of the eight bits will deviate from the original 8-bit parallel data signals. This deviation is just as was described above.

Hence, for restoring such data that is out of order relative to the time of recording to the state in which it was, that is, for putting the upper order bits and the lower order bits into order in their respective parallel-bit words, the block sync signals are detected from the block sync signal data SY in sync signal detection circuit 4. The block sync signal data SY is contained in the unit blocks, $D_1$ to $D_n$, of the parallel data signals, on the basis of the reference readout clock signals RCL. The signals for putting each group of eight upper order and lower order bits into correct arrangement based on the block sync signals are then supplied as bit shift data BS to bit rotation circuit 5. Thus, bit rotation circuit 5 restores the parallel data to the as-recorded state on the basis of the bit shift data BS. Meanwhile, it is seen that signals containing significant time base fluctuations can be successfully coped with by judiciously selecting the storage capacity of the first FIFO memory 3.

On the other hand, the reference block sync signal and the block sync signal of the input digital video signal (DVC) are not in phase with each other, which renders signal processing after time base correction difficult. Thus, the parallel data signals, which have been restored by bit rotation circuit 5 to the as-recorded state, are fed to a second FIFO memory 6 wherein deviations in block phase are compensated.

The reference readout clock signals RCL are also fed to the write clock and readout clock input terminals of second FIFO memory 6. The block sync signal WBZ from sync signal detection circuit 4 is supplied to second FIF memory 6 as the writing start pulse signal, and this signal has the timing shown in FIG. 3. The block sync signal WBZ is simultaneously transmitted to a FIFO control circuit 7. FIFO control circuit 7 is also supplied with a reference block sync signal RSYN and, on the basis of this reference signal, control circuit 7 produces a readout start pulse GRZ for second FIFO memory 6 that has the timing shown in FIG. 3. The reference block sync signal is a fixed pattern sync signal and, thus, has no time base fluctuations. The first reference block sync signal RSYN that is fed into FIFO control circuit 7 after the block sync signal WBZ is input into the FIFO control circuit 7 triggers the readout start pulse GRZ. Thus, the block phase of the output of the second FIFO memory 6, which is the parallel data signal FO2 shown in FIG. 3, can be matched with the reference block sync signal RSYN.

In the case of data dropouts caused by dust, dirt, scratches, and the like on the tape, the block sync signal WBZ that should be at point P in FIG. 3, for example, may be missing. In the absence of block sync signal WBZ, FIFO control circuit 7 does not output the readout start pulse GRZ at the corresponding point, so that the readout operation of second FIFO memory 6 is not affected by such signal absence.

It is noted that when the parallel data signal is stored in first FIFO memory 3 the write clock WCL and the reference write start pulse WSP supplied to first FIFO memory 3 are not in phase with each other. Hence, there is the risk that the reset timing of first FIFO memory 3 may be out of phase by one clock pulse. Nevertheless, such phase deviation is absorbed at the second FIFO memory 6.

As described hereinabove, by the interposition of the time base correction device of the present invention into the data stream of the input digital video signals containing time base fluctuations may be output as time base compensated digital video signals. The time base compensated digital video signals are then subsequently converted into single-bit serial data signals by a parallel/serial converter, not shown in FIG. 2.

The first and second FIFO memories, 3 and 6, are each embodied as an integrated circuit (IC) and, hence, are relatively inexpensive compared with the large and fast main memory required in previously proposed systems. The write clock input, write reset input, readout clock input, and the readout reset input can be separate from each other and mutually asynchronous and may have different cycles in a manner effective for synchronization.

Although bit rotation circuit 5 in the above-described embodiment is arranged between first FIFO memory 3 and second FIFO memory 6, it may also be provided ahead of first FIFO memory 3, that is, between serial/parallel converter 2 and first FIFO memory 3. In that case, the sync signal detection circuit is also provided ahead of the first FIFO memory.

It is possible with the present illustrative embodiment to compensate for time base fluctuations of an input digital video signal by a relatively simple circuit arrangement, yet still reduce costs because a first-in first-out memory, that is, the FIFO memory, is employed in lieu of the much more costly high-speed universal memory.

Thus, the present invention may be applied to an apparatus in which multichannel recording is performed, such as a digital VTR, to contribute further to the reduction in size of such digital VTR.

The above description is given on a single preferred embodiment of the invention, but it will be apparent that many modifications and variations could be effected by one skilled in the art without departing form the spirit or scope of the novel concepts of the invention, which should be determined by the appended claims.

What is claimed is:

1. Apparatus for correcting time base errors in a reproduced digital video signal that includes a block synchronous signal comprising;

means for generating a write clock signal that has a time base error that is the same as in the reproduced digital video signal;

first first-in first-out memory means for writing therein the reproduced digital video signal in response to such write clock signal having a time base error the same as in the reproduced digital video signal, and for reading out therefrom said reproduced digital video signal in response to a read clock signal having no time base error, so that a clock phase of said reproduced digital video signal read out from said first first-in first-out memory means is corrected; and second first-in first-out memory means connected to said first first-in first-out memory means for writing therein an output signal of said first first-in first-out memory means in response to said read clock and to the block synchronous signal included in said output signal and for reading out therefrom said output signal in response to said read clock and to a reference block synchronous signal, so that a time base error in a block phase of said reproduced digital video signal from s id second first-in first-out memory means is corrected.

2. The apparatus according to claim 1, further comprising a synchronous signal detector for detecting the block synchronous signal from the reproduced digital video signal and producing a signal corresponding thereto.

3. The apparatus according to claim 2, in which the reproduced digital video signal is reproduced by a rotary-head video tape recorder and said first first-in first-out memory means receives a write start pulse and read start pulse as a write reset and a read reset, respectively, during a head blanking period to perform timing control of said first first-in first-out memory means.

4. Apparatus for correcting time base errors present in a serial digital signal that includes a block synchronous signal defining successive data blocks, comprising;
   means receiving the serial digital signal for generating therefrom a write clock signal having a time base error the same as that of the serial digital signal,
   converting means also receiving the serial digital signal for converting the digital signal from a serial digital signal to a parallel digital signal;
   first first-in first-out memory means for writing therein an output of said converting means in response to the write clock signal, and for reading out therefrom the output of said converting means in response to a read clock signal having no time base error, so that a clock phase time base error is corrected;
   means for detecting a synchronous signal in the digital signal from said converting means and producing a signal corresponding thereto; and
   second first-in first-out memory means for writing therein an output of said first first-in first-out memory means in response to the read clock and the synchronous signal, and for reading out therefrom the output of said first first-in first-out memory means in response to the read clock and to a reference synchronous signal, so that a block phase time base error included in the output of said first first-in first-out memory means is corrected.

5. The apparatus according to claim 4, in which the serial digital signal is reproduced by a rotary-head video tape recorder and said first first-in first-out memory means receives a write start pulse and a read start pulse during a head blanking period to perform timing control of said first first-in first-out memory means.

* * * * *